(12) United States Patent
Chen et al.

(10) Patent No.: US 11,084,378 B2
(45) Date of Patent: Aug. 10, 2021

(54) ELECTRICAL DEVICE AND CONVEYANCE

(71) Applicant: HannStar Display Corporation, Taipei (TW)

(72) Inventors: Yen-Chung Chen, Taichung (TW); Jiun-Yan Lai, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/779,674

(22) Filed: Feb. 3, 2020

(65) Prior Publication Data
US 2020/0269693 A1   Aug. 27, 2020

(30) Foreign Application Priority Data
Feb. 27, 2019   (CN) .......................... 201910145340.6

(51) Int. Cl.
*G06F 3/041*   (2006.01)
*B60K 35/00*   (2006.01)

(52) U.S. Cl.
CPC .............. *B60K 35/00* (2013.01); *G06F 3/041* (2013.01); *B60K 2370/1533* (2019.05); *G06F 2203/04102* (2013.01)

(58) Field of Classification Search
CPC ....................... G06F 3/041; G06F 2203/04102
See application file for complete search history.

(56) References Cited

U.S. PATENT DOCUMENTS

| | | | | |
|---|---|---|---|---|
| 6,600,527 | B1 * | 7/2003 | Basturk | G02F 1/133536 349/115 |
| 2008/0212271 | A1 | 9/2008 | Misawa | |
| 2010/0066113 | A1 * | 3/2010 | Browne | B60R 7/04 296/24.34 |
| 2010/0090491 | A1 * | 4/2010 | Hipshier | B60R 7/04 296/24.34 |
| 2016/0193924 | A1 * | 7/2016 | Kim | B60K 37/04 296/70 |
| 2016/0202781 | A1 * | 7/2016 | Kim | G06F 1/1643 345/173 |
| 2016/0316575 | A1 * | 10/2016 | Lee | H04M 1/0268 |
| 2017/0322760 | A1 * | 11/2017 | Soh | B60K 37/06 |
| 2020/0331348 | A1 * | 10/2020 | Feng | G06F 3/041 |

FOREIGN PATENT DOCUMENTS

| | | |
|---|---|---|
| CN | 101739057 A | 6/2010 |
| CN | 104249622 A | 12/2014 |
| CN | 104378936 A | 2/2015 |
| CN | 105751984 A | 7/2016 |
| CN | 105788460 A | 7/2016 |
| CN | 105938684 A | 9/2016 |
| CN | 106066721 A | 11/2016 |
| CN | 106103175 A | 11/2016 |
| CN | 106601129 A | 4/2017 |
| CN | 107351763 A | 11/2017 |
| CN | 107406000 A | 11/2017 |
| CN | 108572696 A | 9/2018 |
| FR | 3048211 A1 | 9/2017 |

* cited by examiner

*Primary Examiner* — Md Saiful A Siddiqui

(74) *Attorney, Agent, or Firm* — CKC & Partners Co., LLC

(57) ABSTRACT

An electrical device for a conveyance is provided. The electrical device includes a flexible display panel having a first edge and a partition device having a second edge. The partition device is disposed between the flexible display panel and the conveyance. A relative position between the first edge and the second edge is changeable.

14 Claims, 9 Drawing Sheets

ELECTRICAL DEVICE AND CONVEYANCE

RELATED APPLICATIONS

This application claims priority to China Application Serial Number 201910145340.6 filed Feb. 27, 2019, which is herein incorporated by reference.

BACKGROUND

Field of Invention

The present invention relates to an electrical device for a conveyance.

Description of Related Art

In recent years, automotive electronics have become more and more diverse and functional. For example, traditional dashboards use pointers to display speed and engine speed, but recently some manufacturers have used display panels instead. A head-up display may be placed on a front windshield, or a screen is projected onto the windshield, so that the driver can see the speed and other information on the windshield. Therefore, it is an issue in the field about how to develop a convenient vehicle device.

SUMMARY

Embodiments of the invention provide an electrical device for a conveyance. The electrical device includes a flexible display panel having a first edge and a partition device having a second edge. The partition device is disposed between the flexible display panel and the conveyance, and a relative position between the first edge and the second edge is changeable.

In some embodiments, when the first edge moves relative to the second edge, the flexible display panel exposes a portion of the partition device.

In some embodiments, when the first edge moves, a display area of the flexible display panel changes correspondingly, and content shown in the display area changes correspondingly.

In some embodiments, the conveyance has a first storage space, and the partition device is disposed between the flexible display panel and the first storage space. When the second edge moves, the partition device exposes a portion of the first storage space.

In some embodiments, the partition device is transparent. When the partition device completely covers the first storage space and the flexible display panel completely covers the partition device, the flexible display panel is in a transparent mode such that a transparent area of the flexible display panel overlaps with at least a portion of the partition device and the first storage space.

In some embodiments, the flexible display panel has a first surface, and the first edge moves along the first surface. The partition device has a second surface, the second edge moves along the second surface. The first surface conforms to the second surface.

In some embodiments, the flexible display panel has a touch function. A portion of the partition device that is overlapped with the flexible display panel supports the flexible display panel to provide the touch function.

In some embodiments, the electrical device further includes two sliding grooves disposed opposite to each other. A positioning structure is disposed in the two sliding grooves, two side edges of the flexible display panel adjacent to the first edge are disposed in the two sliding grooves respectively. The first edge moves along the two sliding grooves and is fixed to the positioning structure for changing a display area of the flexible display panel.

In some embodiments, the electrical device further includes an electric controller electrically connected to the flexible display panel and the partition device. The electric controller controls movement or relative positions of the first edge and the second edge.

In some embodiments, the conveyance has a second storage space disposed at a side of the flexible display panel. When the flexible display panel or the partition device moves, the flexible display panel or the partition device is bended or curved to be housed in the second storage space.

From another aspect, a conveyance including the electrical device is provided.

Compared with the prior art, the display function of the electrical device can be flexibly applied to various conveyances.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
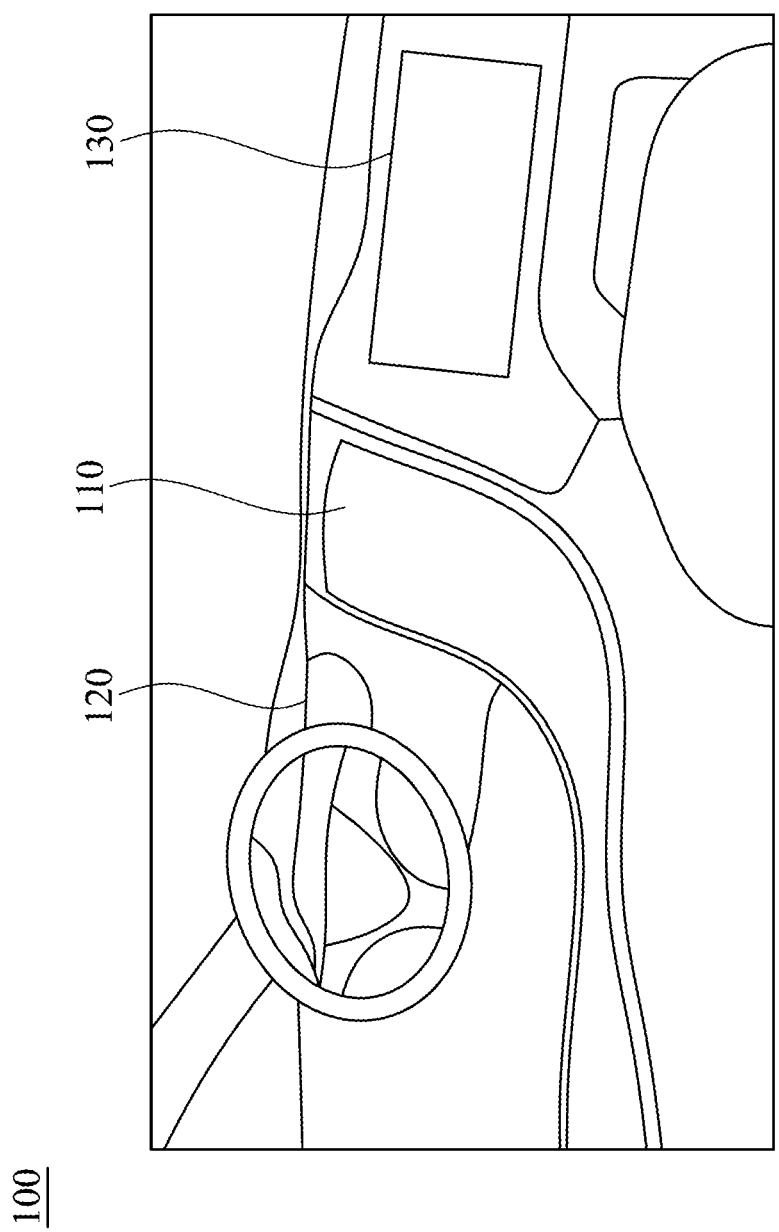
FIG. 1 to FIG. 3 are diagrams illustrating an electrical device in a conveyance in accordance with some embodiments.
Figure 2:
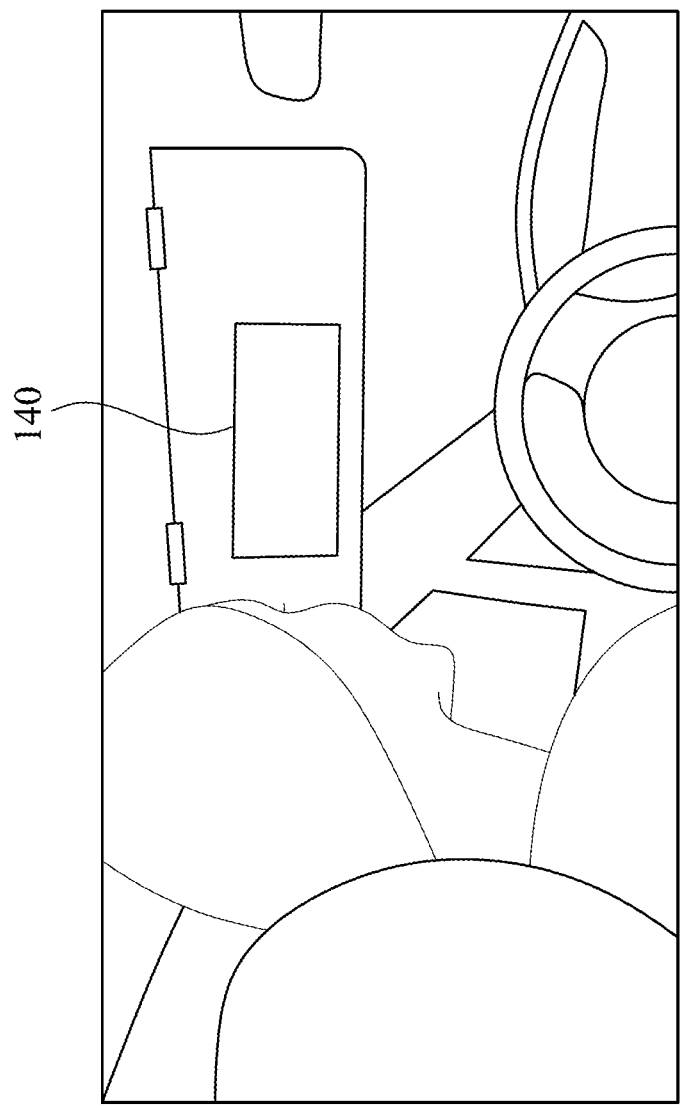
Figure 3:
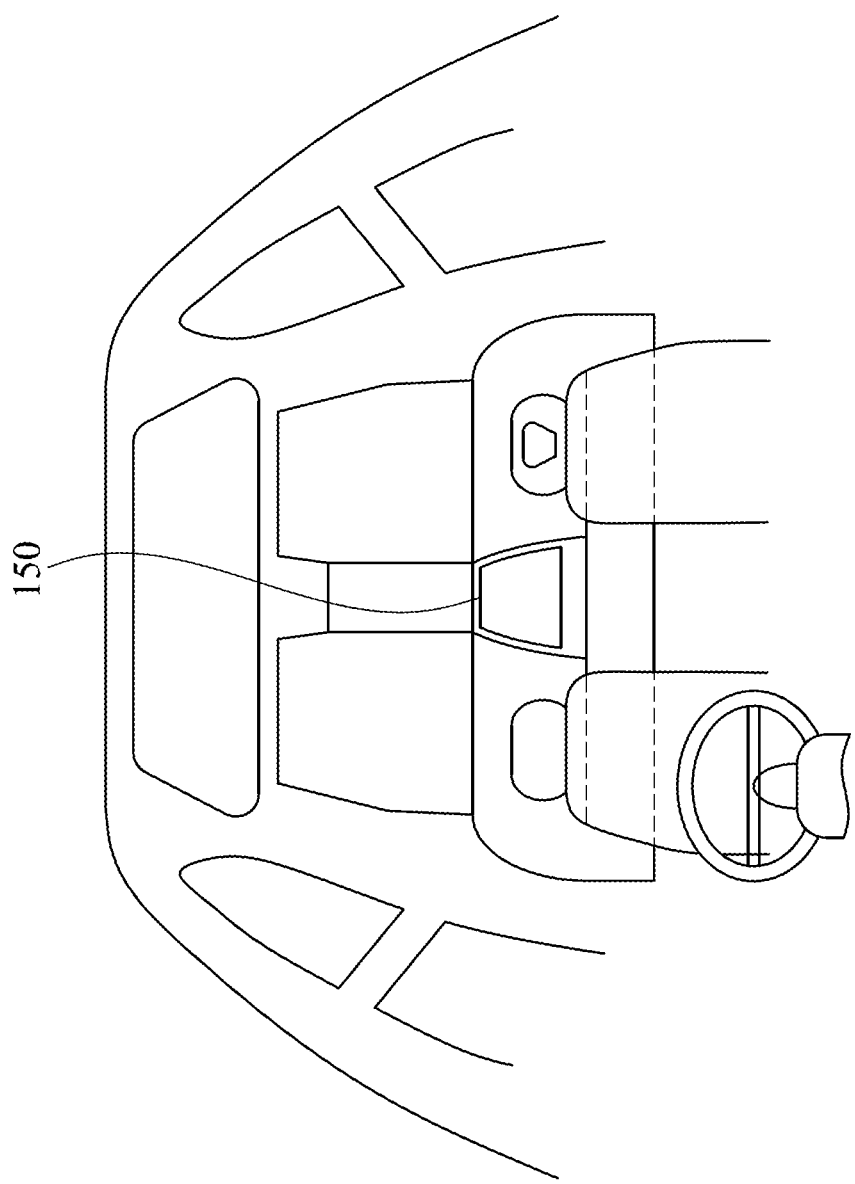

FIG. 1 is a diagram illustrating an electrical device in a conveyance in accordance with some embodiments. Referring to FIG. 1, a conveyance 100 is a car in the embodiment of FIG. 1, but the conveyance 100 may be a motorcycle, a bus, a truck, a train, a ship, a boat, an aircraft or a space vehicle, which is not limited in the invention. An electrical device in the embodiment at least includes a flexible display panel and a partition device that are disposed at any suitable location in the conveyance 100. For example, an electrical device 110 may be disposed at a central console in which the flexible display panel displays any related information such as navigation information, air conditioning information, etc. Alternatively, an electrical device 120 is disposed on a dashboard in which the flexible display panel displays vehicle speed, engine speed, etc. In another embodiment, an electrical device 130 is disposed at a compartment at the passenger seat in which the flexible display panel displays information related to the stuff stored in the compartment. In an embodiment of FIG. 2, an electrical device 140 is disposed on a visor. In an embodiment of FIG. 3, an electrical device 150 is disposed on an armrest at the rear seat. People in the art should be able to modify the aforementioned disclosure. The position of the electrical device and the content displayed by the electrical device are not limited in the invention. The electrical device 110 is taken as an example for description.

FIG. 4A to FIG. 4D are diagrams illustrating side views and front views of the electrical device in accordance with some embodiments. The electrical device 110 includes a flexible display panel 111 and a partition device 112. The flexible display panel 111 is, for example, an organic light emitting diode (OLED) panel, a liquid crystal display panel, a micro LED panel, or an electrophoretic panel in which types of the display panel are not limited in the invention. The partition device 112 may be transparent or opaque. The partition device 112 may include any suitable material harder than the flexible display panel 111, which is not limited in the invention. For example, the partition device 112 may be a sliding cover made of metal, leather, plastic, or the combination thereof. The partition device 112 is disposed between the flexible display panel 111 and the conveyance (e.g. between the flexible display panel 111 and the central console). In particular, the flexible display panel 111 has an edge 111a (also referred to a first edge) while the partition device 112 has an edge 112a (also referred to a second edge), and a relative position between the edge 111a and edge 112a is changeable. For example, a distance or an angle formed between the edge 111a and the edge 112a is changeable.

Figure 4A:
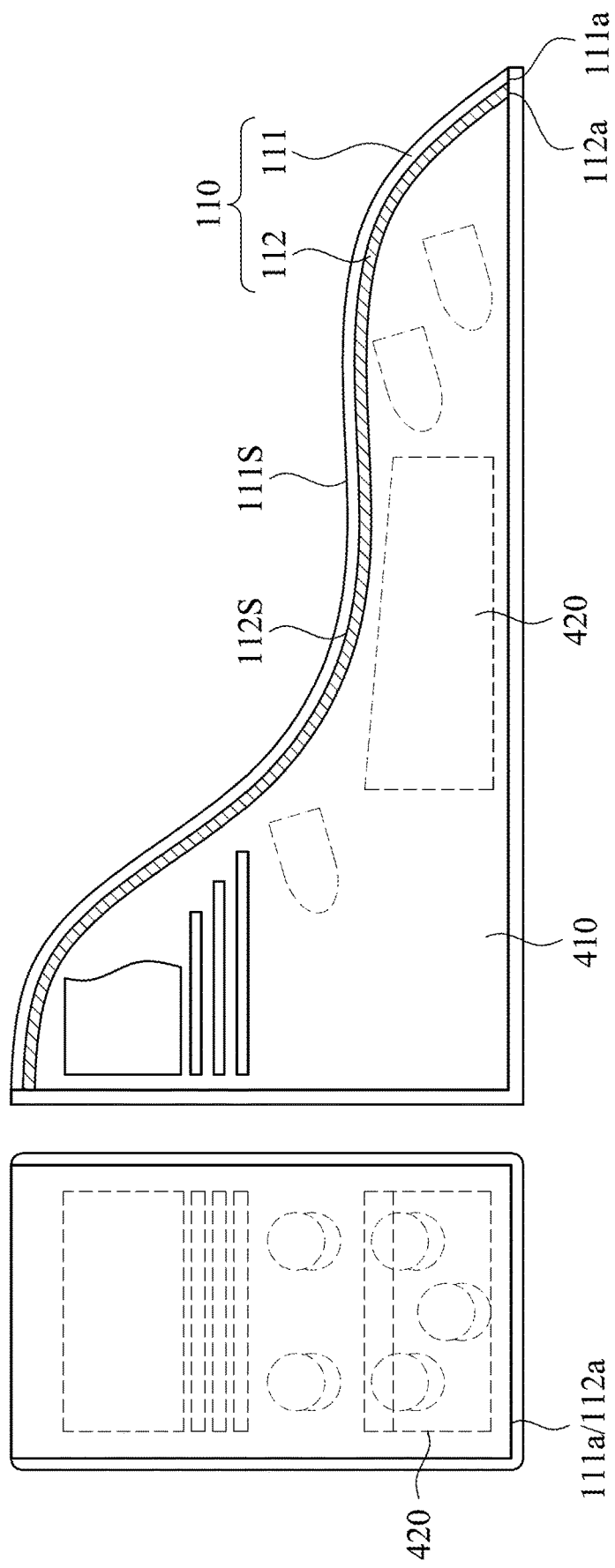
FIG. 4A to FIG. 4D are diagrams illustrating side views and front views of the electrical device in accordance with some embodiments.

In the embodiment of FIG. 4A, both of the flexible display panel 111 and the partition device 112 cover a central console 410 while the edge 111a is aligned with the edge 112a at the button of the central console 410. The central console 410 includes a first storage space 420. That is, the partition device 112 is disposed between the flexible display panel 111 and the first storage space 420. The partition device 112 is transparent in some embodiments, and the flexible display panel 111 is in a transparent mode when the partition device 112 completely covers the first storage space 420 and the flexible display panel 111 completely covers the partition device 112 so that a transparent area of the flexible display panel 111 covers at least a portion of the partition device 112 and the first storage space 420, and thus a user can see the stuff in the first storage space 420 directly. However, in other embodiments, the partition device 112 may be opaque; or the flexible display panel 111 may be switched into an opaque mode; or the transparent area of the flexible display panel 111 does not overlap with the first storage space 420 while being switched into the transparent mode, and accordingly the user would not see the stuff in the first storage space 420. In other embodiments, transmittance of the partition device 112 can be adjusted by manual control or set by a default program of the conveyance 100.

Figure 4B:
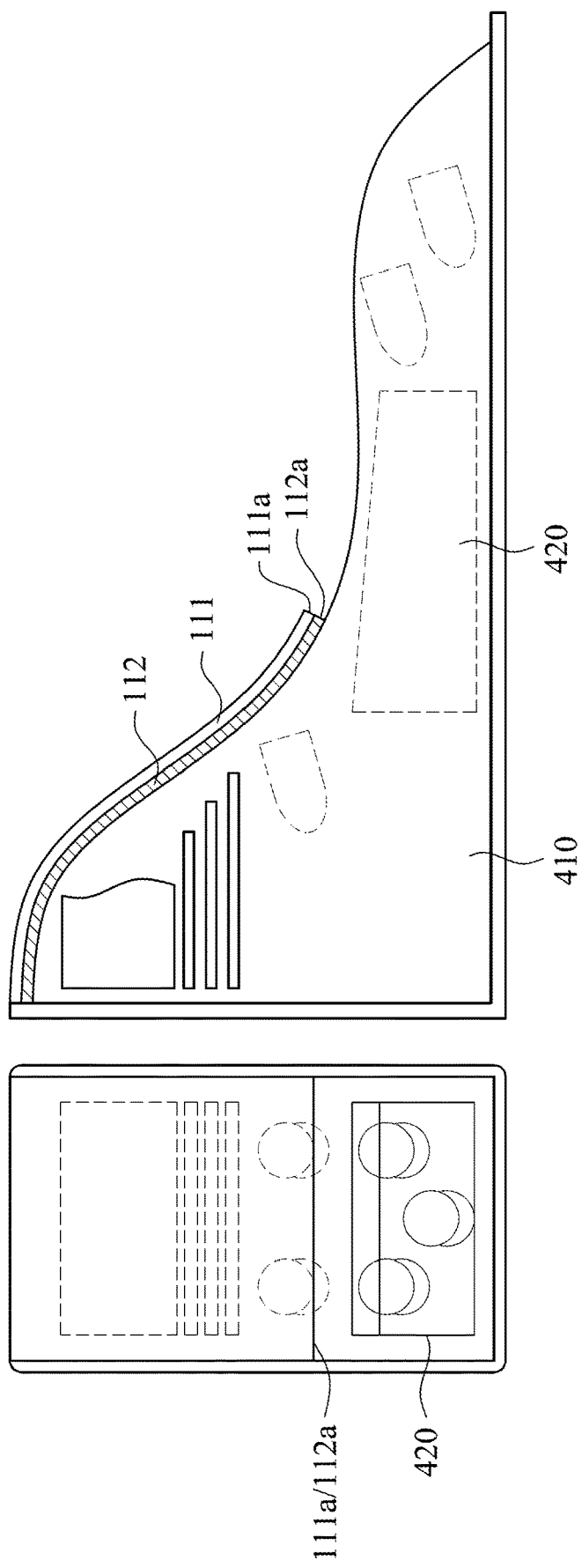
Figure 4C:
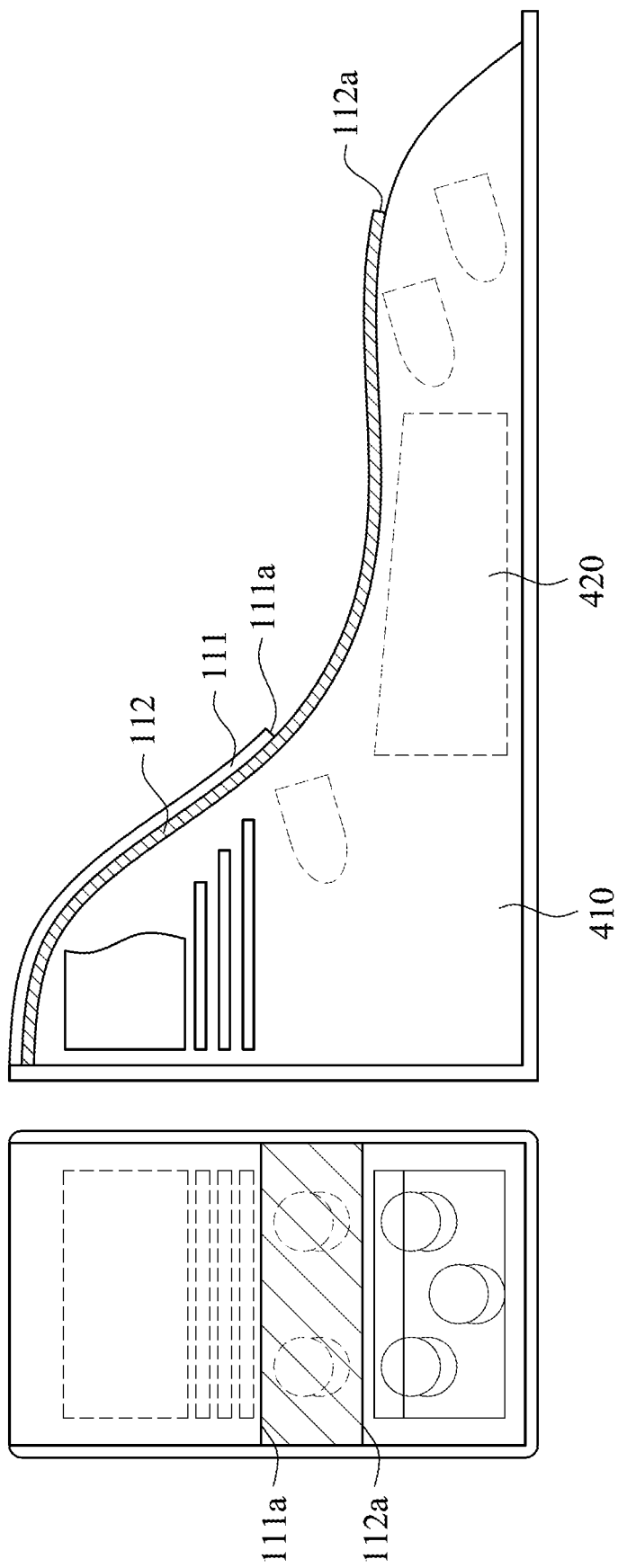
Figure 4D:
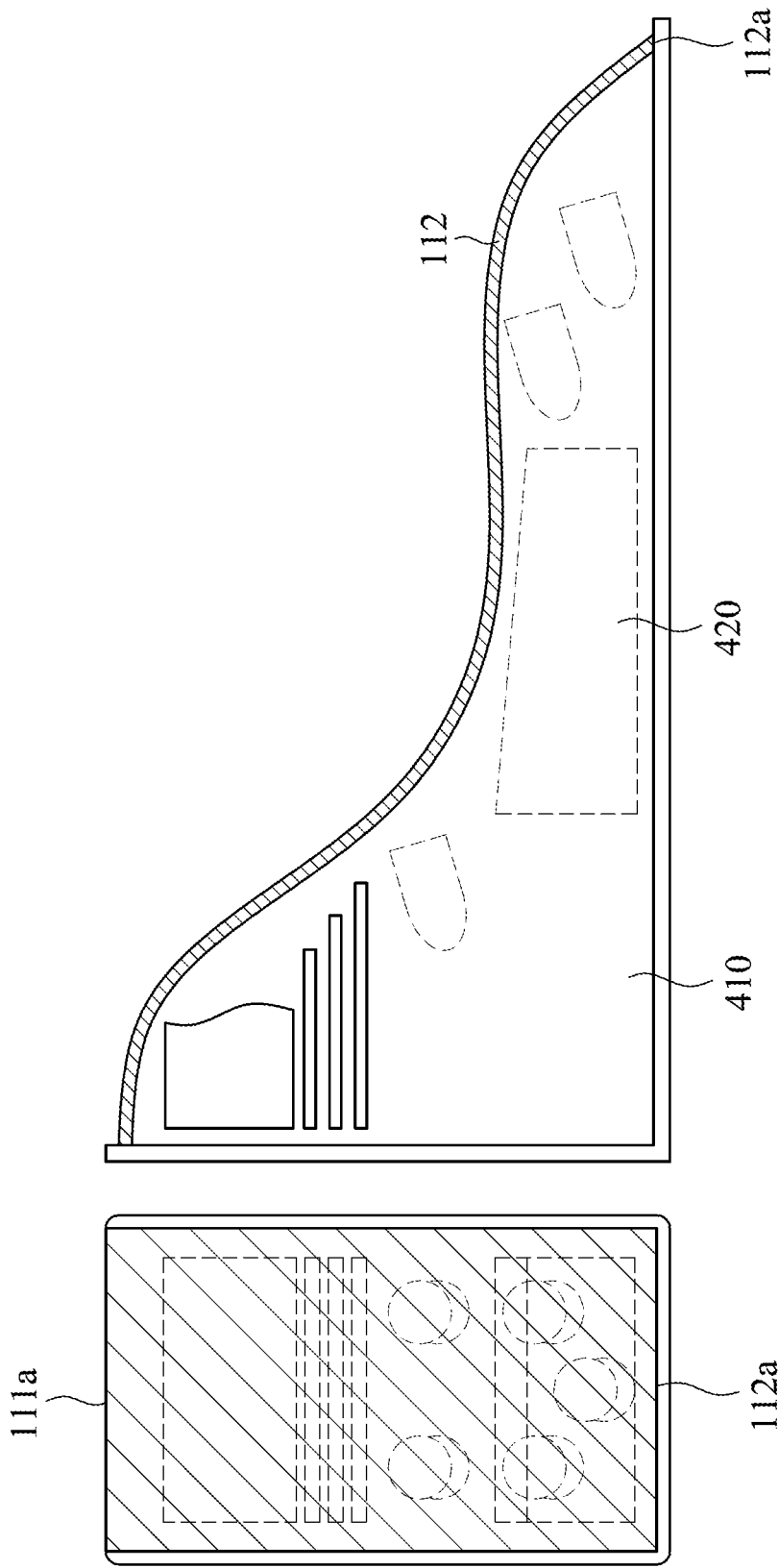

In FIG. 4B, the edge 111a is aligned with the edge 112a at the middle of the central console 410. When the edge 112a moves, the partition device 112 may expose a portion of the first storage space 420, and thus the user can store or take the stuff in the first storage space 420. In FIG. 4C, the edge 111a is above the edge 112a without being aligned with the edge 112a in the front view. It is shown in FIG. 4C that when the edge 111a moves relative to the edge 112a, the flexible display panel 111 may expose a portion of the partition device 112. In FIG. 4D, the edge 111a is at the top of the central console 410 while the edge 112a is at the button of the central console 410.

In some embodiments, when the edge 111a moves, a display area of the flexible display panel 111 changes correspondingly, and the content shown in the display area changes correspondingly. For example, in the situation of FIG. 4A, the display area of the flexible display panel 111 cover the whole central console 410 to display complete information; but in the situation of FIG. 4B, the display area of the flexible display panel 111 only covers the upper portion of the central console 410 to display partial information; in the situation of FIG. 4D, the display area of the flexible display panel 111 does not cover the central console 410 or the flexible display panel 111 does not display any image (i.e. there is no display area). The change of the display area can be triggered by any sensor, controller, or setting of a human machine interface, which is not limited in the invention.

It is shown in FIG. 4A that the flexible display panel 111 has a surface 111s (also referred to a first surface) and the edge 111a moves along the surface 111s. Similarly, the partition device 112 has a surface 112s (also referred to a second surface) and the edge 112a moves along the surface 112s. The surface 111s conforms to the surface 112s, and thus the partition device 112 can support the flexible display panel 111. In some embodiments, the flexible display panel 111 also has a touch function (e.g. touch sensing electrodes or a touch panel is disposed in the flexible display panel 111), and a portion of the partition device 112 that is overlapped with the flexible display panel 111 supports the flexible display panel 111 to provide the touch function well. For example, the whole flexible display panel 111 can provide the touch function in the situation of FIG. 4A, but only the portion of the flexible display panel 111 corresponding to the upper portion of the central console 410 can provide the touch function in the situation of FIG. 4B.

Figure 5:
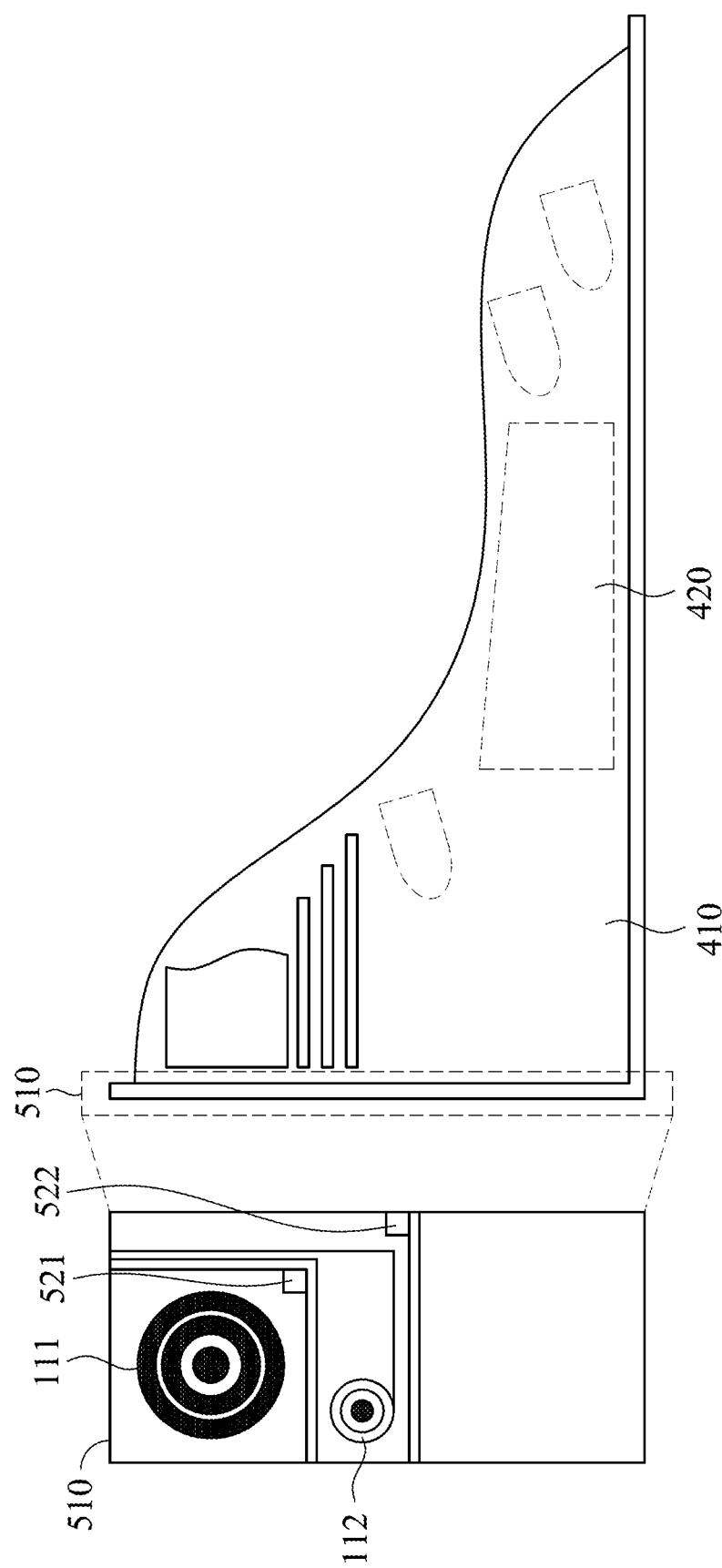
FIG. 5 is a diagram illustrating a side view of the electrical device in accordance with an embodiment.

FIG. 5 is a side view of the electrical device in accordance with an embodiment. Referring to FIG. 5, the central console of the conveyance 100 has a second storage space 510. An enlarged schematic diagram of the second storage space 510 is shown at the left-hand side of FIG. 5. The second storage space 510 is disposed at one side (e.g. left-hand side) of the flexible display panel 111. When the flexible display panel 111 or the partition device 112 moves, the flexible display panel 111 or the partition device 112 is bended or curved to be housed in the second storage space 510. In some embodiments, the user can move the flexible display panel 111 and/or the partition device 112 by hands. In some embodiments, the flexible display panel 111 and/or the partition device 112 can be moved electrically. For example, an electric controller 521 and an electric controller 522 are disposed in the second storage space 510 in which the electric controller 521 is electrically connected to the flexible display panel 111 and the electric controller 522 is electrically connected to the partition device 112. The electric controllers 521 and 522 may include motors or power transmission mechanism for moving the flexible display panel 111 and the partition device 112. In other words, the electric controllers 521 and 522 can control movement or relative positions of the edges 111a and 112a. However, the mechanism, means, and devices for moving the flexible display panel 111 and the partition device 112 are not limited in the invention.

Figure 6:
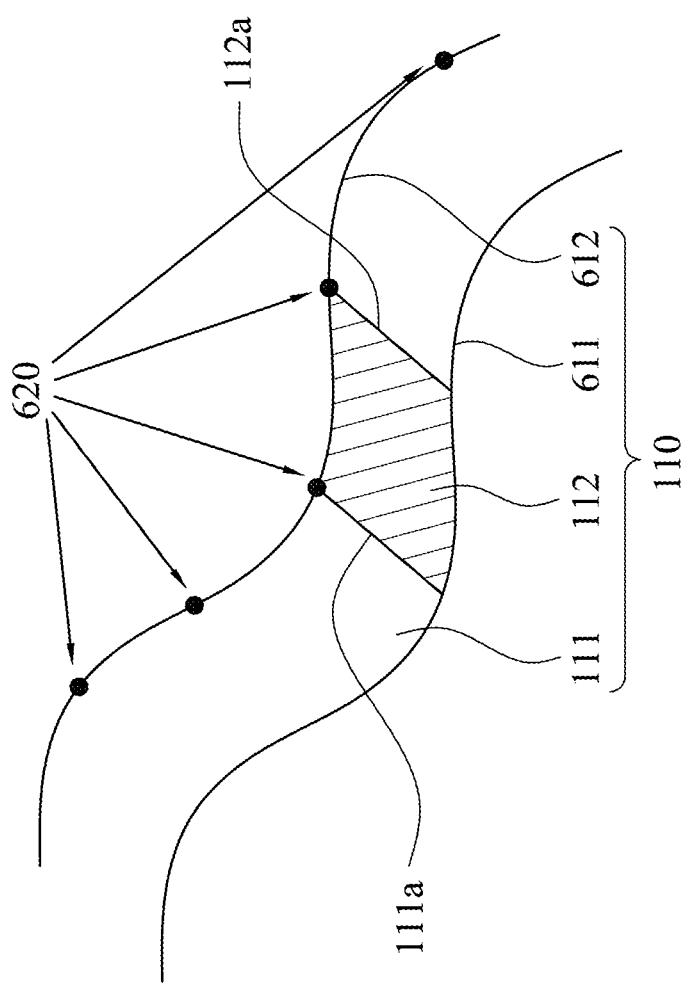
FIG. 6 is a schematic diagram of sliding grooves in the electrical device in accordance with an embodiment.

FIG. 6 is a schematic diagram of sliding grooves in the electrical device in accordance with an embodiment. FIG. 6 is a bird view of the situation of FIG. 4. In some embodiments, the electrical device 110 includes two sliding grooves 611 and 612 disposed opposite to the each other. Two side edges of the flexible display panel 111 that are adjacent to the edge 111a are disposed in the sliding grooves 611 and 612 respectively. Similarly, two side edges of the partition device 112 that are adjacent to the edge 112a are disposed in the sliding grooves 611 and 612 respectively. Positioning structures 620 such as concavities, magnetic devices, cassettes, latches are disposed in the sliding grooves 611 and 612. When the flexible display panel 111 and the partition device 112 moves, the edges 111a and 112a are fixed to the positioning structures 620.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrical device mounted on a conveyance, comprising:
   a flexible display panel having a first edge; and
   a partition device having a second edge, wherein the partition device is disposed between the flexible display panel and a central console of the conveyance, and a relative position between the first edge and the second edge is changeable,
   wherein the first edge and the second edge are movable,
   wherein when the first edge moves relative to the second edge, the flexible display panel exposes a portion of the partition device,
   wherein when the first edge is aligned with the second edge at a bottom of the central console, a display area of the flexible display panel completely covers the central console,
   wherein when the first edge is aligned with the second edge at a middle of the central console, the display area of the flexible display panel covers only an upper portion of the central console,
   wherein when the first edge is at a top of the central console and the second edge is at the bottom of the central console, the display area of the flexible display panel does not cover the central console,
   wherein the conveyance has a first storage space and the partition device is disposed between the flexible display panel and the first storage space, when the partition device completely covers the first storage space and the flexible display panel completely covers the partition device, the flexible display panel is in a transparent mode such that a transparent area of the flexible display panel overlaps with at least a portion of the partition device and the first storage space.

2. The electrical device of claim 1,
   wherein when the second edge moves, the partition device exposes a portion of the first storage space.

3. The electrical device of claim 1, further comprising:
   two sliding grooves disposed opposite to each other, wherein a positioning structure is disposed in the two sliding grooves, two side edges of the flexible display panel adjacent to the first edge are disposed in the two sliding grooves respectively,
   wherein the first edge moves along the two sliding grooves and is fixed to the positioning structure for changing a display area of the flexible display panel.

4. The electrical device of claim 1, further comprising:
   an electric controller, electrically connected to the flexible display panel and the partition device, wherein the electric controller controls movement or relative positions of the first edge and the second edge.

5. The electrical device of claim 1, wherein the conveyance has a second storage space disposed at a side of the flexible display panel,
   wherein when the flexible display panel or the partition device moves, the flexible display panel or the partition device is bended or curved to be housed in the second storage space.

6. The electrical device of claim 1, wherein the flexible display panel has a first surface, and the first edge moves along the first surface,
   wherein the partition device has a second surface, the second edge moves along the second surface, and the first surface conforms to the second surface.

7. The electrical device of claim 6, wherein the flexible display panel has a touch function, a portion of the partition device that is overlapped with the flexible display panel supports the flexible display panel to provide the touch function.

8. A conveyance, comprising:
   a central console comprising a first storage space; and
   an electrical device comprising:
   a flexible display panel having a first edge; and
   a partition device having a second edge, wherein the partition device is disposed between the flexible display panel and the central console of the conveyance, and a relative position between the first edge and the second edge is changeable,
   wherein the first edge and the second edge are movable,
   wherein when the first edge moves relative to the second edge, the flexible display panel exposes a portion of the partition device,
   wherein when the first edge is aligned with the second edge at a bottom of the central console, a display area of the flexible display panel completely covers the central console,
   wherein when the first edge is aligned with the second edge at a middle of the central console, the display area of the flexible display panel covers only an upper portion of the central console,
   wherein when the first edge is at a top of the central console and the second edge is at the bottom of the central console, the display area of the flexible display panel does not cover the central console,
   wherein the partition device is disposed between the flexible display panel and the first storage space, when the partition device completely covers the first storage space and the flexible display panel completely covers the partition device, the flexible display panel is in a transparent mode such that a transparent area of the flexible display panel overlaps with at least a portion of the partition device and the first storage space.

9. The conveyance of claim 8,
   wherein when the second edge moves, the partition device exposes a portion of the first storage space.

10. The conveyance of claim 8, wherein the electrical device further comprises two sliding grooves disposed opposite to each other, a positioning structure is disposed in the two sliding grooves, and two side edges of the flexible display panel adjacent to the first edge are disposed in the two sliding grooves respectively,
> wherein the first edge moves along the two sliding grooves and is fixed to the positioning structure for changing a display area of the flexible display panel.

11. The conveyance of claim 8, further comprising:
an electric controller, electrically connected to the flexible display panel and the partition device, wherein the electric controller controls movement or relative positions of the first edge and the second edge.

12. The conveyance of claim 8, wherein the conveyance has a second storage space disposed at a side of the flexible display panel,
> wherein when the flexible display panel or the partition device moves, the flexible display panel or the partition device is bended or curved to be housed in the second storage space.

13. The conveyance of claim 8, wherein the flexible display panel has a first surface, and the first edge moves along the first surface,
> wherein the partition device has a second surface, the second edge moves along the second surface, and the first surface conform to the second surface.

14. The conveyance of claim 13, wherein the flexible display panel provides a touch function, a portion of the partition device that is overlapped with the flexible display panel supports the flexible display panel to provide the touch function.

\* \* \* \* \*